A. WOOLNER.
Improvement in Treating Grain for Distilling and Brewing.
No. 124,188. Patented Feb. 27, 1872.
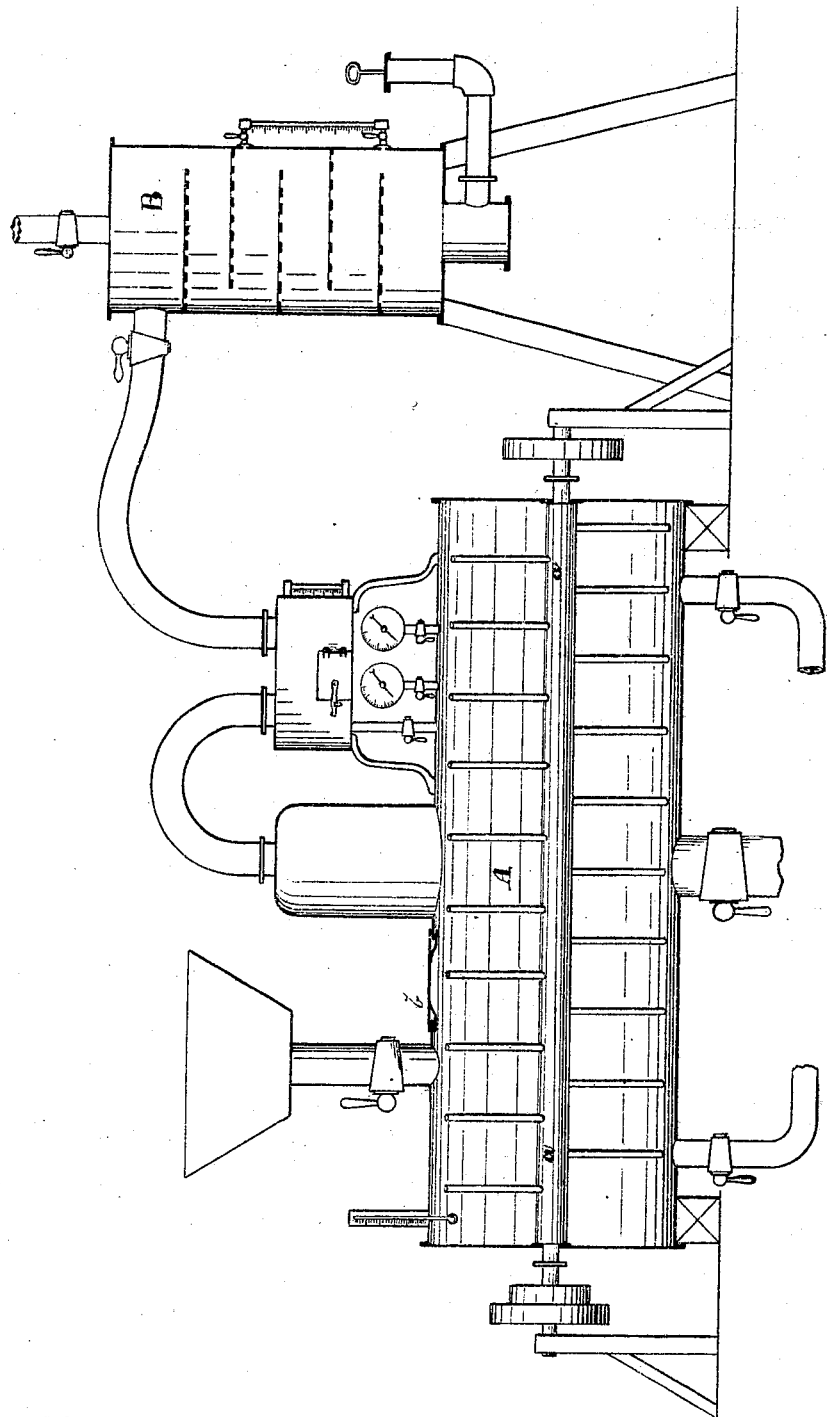
Witnesses
O. S. Lovell
Alex Abraham
Inventor
Adolph Woolner
by Lewis Abraham
atty

UNITED STATES PATENT OFFICE.

ADOLPH WOOLNER, OF LOUISVILLE, KENTUCKY.

IMPROVEMENT IN TREATING GRAIN FOR DISTILLING AND BREWING.

Specification forming part of Letters Patent No. 124,188, dated February 27, 1872.

Specification describing an Improved Process for Treating Grain in its preparation for distillers' and brewers' mash, invented by ADOLPH WOOLNER, of the city of Louisville, county of Jefferson and State of Kentucky.

My invention relates to the treatment of grain in its preparation as mash to be used in fermentation at breweries and distilleries; the object being to fully develop its amylaceous properties and arrest the elimination of the oils that detract from the sugar-producing capacity of the grain, reference being had to the drawing that accompanies this specification, which is annexed as an exhibit, showing an apparatus by means of which the process can be practically carried out.

The exhibit shows a sectional view of an apparatus with suitable running-gear, in which A is a boiler; $a\ a$, a revolving rake; $b$, a man-hole. B is a condenser.

Appropriate letters of reference indicate the several parts.

My process is as follows: I boil the mash in a partial vacuum, causing the shells or outside envelopes of the grain to burst open quickly under the diminished atmospheric pressure. All the interior portions of the separate capsules are thus at once exposed and brought into immediate contact with the heat and water, and the whole is mixed ready for the fermenting-tubs before any oil appears or is separated, which cannot be effected by the usual slow process of steaming at a high temperature. I take the necessary quantity of water—usually about sixteen gallons to the bushel of grain—and place it into a copper or iron boiler, by preference cylindrical in shape, the grain being put in through a man-hole made for this purpose, a revolving rake in the boiler being set in motion at the same time so as to well mix together the grain and water. This rake should be continued in motion until all the grain is received. When this is done the man-hole must be hermetically closed and the water supply stopped. Connected with the boiler is a condenser, to which is attached an air-pump, which, as soon as all the connections are closed, is set in motion and worked until the pressure on the vacuum-gauge shows about twenty-four inches. When this is attained the air-pump is stopped, and steam is let in, through one or more pipes leading into the boiler, until the meal and water boil, which, as the atmospheric pressure has been removed, will be at about 130° Fahrenheit if Indian corn is used, and about 150° Fahrenheit for other grain. After this, air-cocks on the top of the boiler are opened and the steam accumulated while boiling is let off until the steam-gauge attached to the boiler shows zero, when the air-cocks are closed. The rake is again set revolving, and the vapor thrown up passes through pipes for this purpose into the condenser, through which a stream of cold water is now caused to flow. A pump is again set in motion to draw off the heated air and water, in order to cool the mash in the boiler to a point, say, about 154° Fahrenheit, preparatory to introducing the malt previously prepared for this purpose. The whole mass should have a temperature of about 150° Fahrenheit after the introduction of the malt. If it has not, steam should again be let in, and the whole stirred and boiled until this point is attained. This closes the process, the boiler being emptied through an outlet opened for this purpose, leading the mash to the regular tubs, where it is cooled and reduced with additional cold water to about 80°, ready for yeasting.

My process is not limited to the exact temperatures mentioned. The degrees stated are believed to be the proper scale to insure the best success; but I do not confine myself in my process alone to these temperatures, which can be varied as discretion and experience may suggest; nor do I limit myself to the shape of any particular machinery, as my intention is to avail myself of that which will stand most inner and outer pressure and otherwise suitable for my process.

What I claim is—

The process of treating grain in preparation for fermentation by boiling in a closed vessel at a low temperature in a partial vacuum, substantially as herein described.

Witnesses     ADOLPH WOOLNER.
    J. C. CHAMBERS,
    WM. P. CHAMBERS.